(12) United States Patent
Zhang

(10) Patent No.: US 8,439,390 B2
(45) Date of Patent: May 14, 2013

(54) THREE-WHEELED COLLAPSIBLE GOLF CART

(75) Inventor: Sheng Zhang, Ningbo (CN)

(73) Assignee: Ningbo Wentai Equipment Co., Ltd., Ningbo (CN)

( * ) Notice: Subject to any disclaimer, the term of this patent is extended or adjusted under 35 U.S.C. 154(b) by 182 days.

(21) Appl. No.: 12/687,992

(22) Filed: Jan. 15, 2010

(65) Prior Publication Data

US 2011/0175331 A1 Jul. 21, 2011

(51) Int. Cl.
*B62B 3/02* (2006.01)

(52) U.S. Cl.
USPC .... 280/641; 280/651; 280/DIG. 6; 280/47.34

(58) Field of Classification Search ............. 280/62, 280/641, 651, DIG. 6
See application file for complete search history.

(56) References Cited

U.S. PATENT DOCUMENTS

| | | | | |
|---|---|---|---|---|
| 6,510,927 B1* | 1/2003 | Wu | | 188/31 |
| 6,698,789 B2* | 3/2004 | Reimers et al. | | 280/651 |
| 6,719,319 B2* | 4/2004 | Liao | | 280/654 |
| 6,811,162 B2* | 11/2004 | Liao | | 280/47.2 |
| 6,827,366 B1* | 12/2004 | Wu | | 280/651 |
| 6,969,078 B2* | 11/2005 | Liao | | 280/38 |
| 7,000,928 B2* | 2/2006 | Liao | | 280/38 |
| 7,128,333 B2* | 10/2006 | Reimers et al. | | 280/651 |
| 7,137,644 B2* | 11/2006 | Kimberley | | 280/651 |
| 7,147,242 B2* | 12/2006 | Wu | | 280/641 |
| 7,552,931 B2* | 6/2009 | Liao | | 280/47.34 |
| 7,862,053 B2* | 1/2011 | Liao | | 280/47.34 |
| 7,866,685 B2* | 1/2011 | Liao | | 280/651 |
| 2009/0115168 A1* | 5/2009 | Liao | | 280/651 |
| 2010/0090443 A1* | 4/2010 | Liao | | 280/651 |
| 2010/0176577 A1* | 7/2010 | Liao | | 280/651 |

* cited by examiner

*Primary Examiner* — Katy M Ebner

(74) *Attorney, Agent, or Firm* — Jen-Feng Lee, Esq.

(57) ABSTRACT

A three-wheeled golf cart having collapsible mechanism to fold the cart down for storage and transport where the three wheels are placed evenly around the compact volume of the collapsed unit and a button-control unit allows for the front wheel to turn 180 degrees so that the front wheel will be turned and rotated to an offset position away from the center line of the main tube frame, resulting in a small and compact size storage and transport.

4 Claims, 8 Drawing Sheets

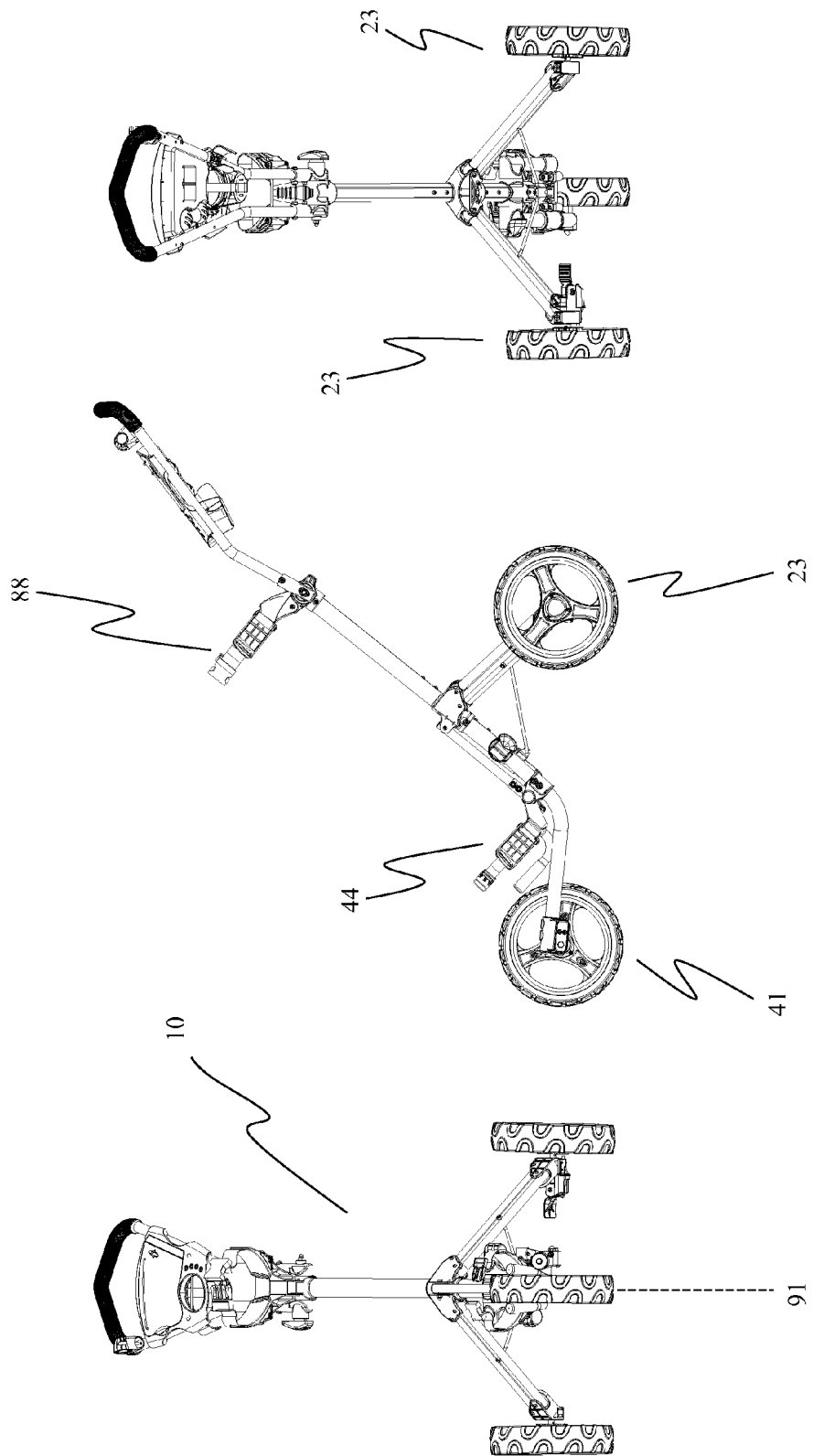

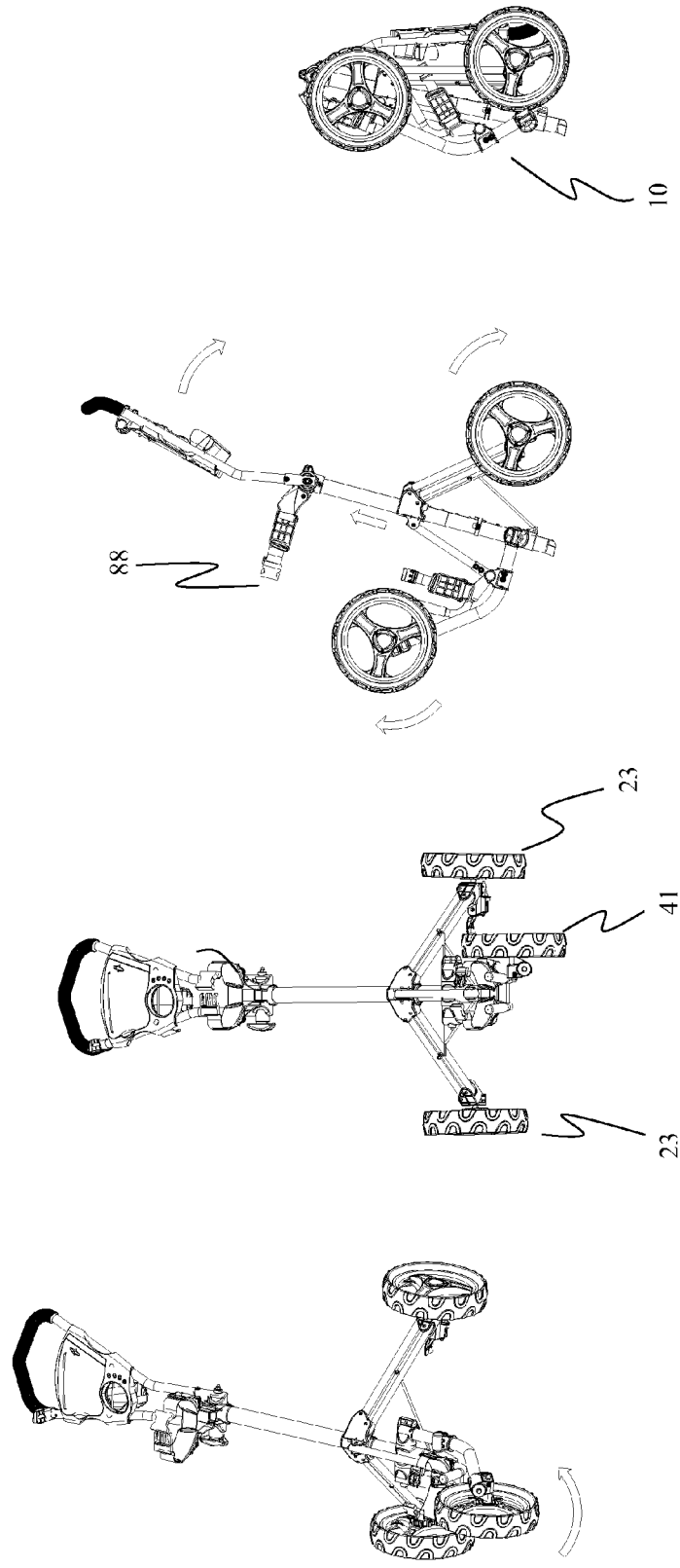

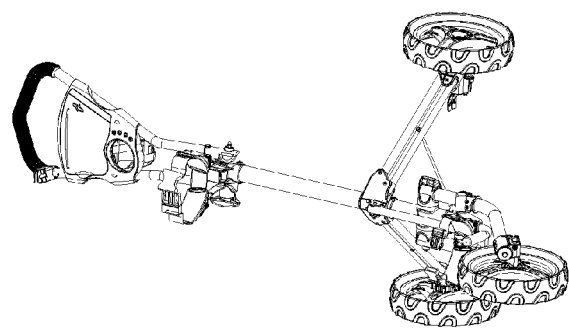
FIGURE 5D
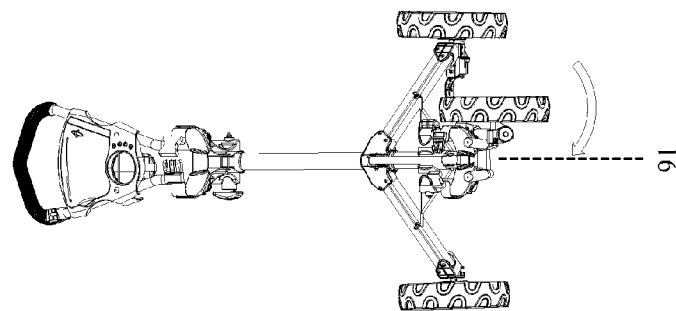
FIGURE 5C
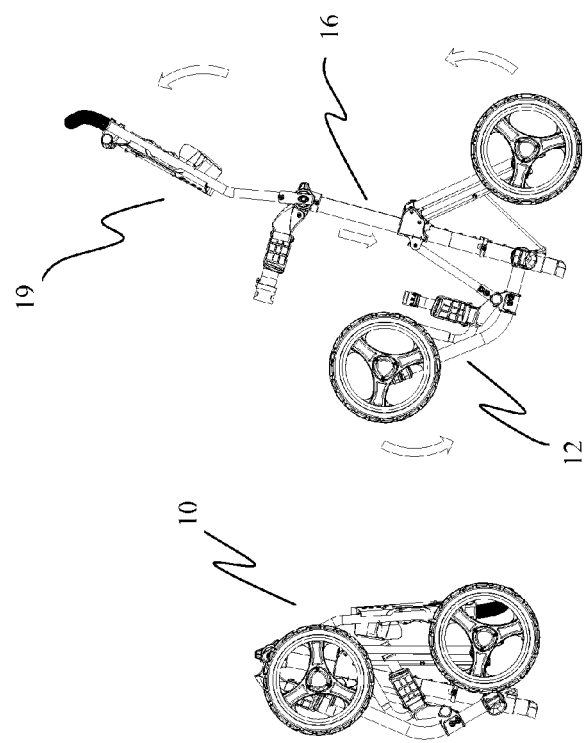
FIGURE 5B
FIGURE 5A

THREE-WHEELED COLLAPSIBLE GOLF CART

FIELD AND BACKGROUND OF THE INVENTION

The present invention relates generally to a golf cart that is self-balancing and collapsible, and thus is easy to use by golfers and easy to carry or put away for storage because the small and compact size when the golf cart is collapsed.

The sport of golf has gained tremendous popularity in recent years. The sport of golf, however, routinely have players carrying 11-13 clubs (or more, if playing for leisure purpose and not subject to rules promulgated by the US Golf Association) in a bag. The use of a golf cart is thus part of the needed equipment.

For easy of carrying and storage, 2-wheeled collapsible golf cart has been around for many years. The collapsing of the traditional 2-wheeled cart is a single-fold structure, though simple and easy to use, is not self-balancing and requires players' hand power to keep its rolling balance when pulling or pushing it.

To overcome this problem, 3-wheeled golf cart is adopted, where players can leave the golf cart alone in a free-standing mode and need only pull or push it, without worrying about maintaining its balance at time of moving the golf cart. The early 3-wheeled golf cart is structurally the same as the 2-wheeled model with an added front wheel. Other than this front wheel (making it a self-balancing free-standing golf cart), the folding/collapsing mechanism is not changed or improved, as shown in FIG. 1.

Because of increased size of 3-wheeled golf cart, collapsible 3-wheeled golf cart is also invented, to reduce the size at time of transporting and storage. An example is the collapsible golf cart in U.S. Pat. No. 7,137,644, issued to Kevin Kimberley ("Kimberley 644 Patent").

Present invention provides for a 3-wheel collapsible golf cart that has a collapsing mechanism different from and outside of the teaching scope of Kimberley 644 Patent and actually corrects the weight concentration problem as a result of the 3 wheels being close to one another, as shown by the collapsed position in the Kimberley 644 Patent.

SUMMARY OF THE INVENTION

The structure of a 3-wheel push cart, in and of itself, cannot be patented, as this structure existed at least 100 years ago. However, the structure of a collapsible 3-wheel golf cart, as taught and disclosed herein, provides for the flexibility of folding down and reducing the size of the cart, resulting in a small and compact package, easy for transporting and storage. Not only that, due to the particular teaching disclosed herein, the collapsed compactness has a more even weight distribution than that of the Kimberley 644 Patent, and thus created a useful collapsible golf cart that is safer to handle, given that collapsed sizes may be comparable to each other.

BRIEF DESCRIPTION OF THE DRAWINGS

FIG. 2a shows the front view of the golf cart of present invention, in expanded position.

FIG. 2b shows the side view of the golf cart of present invention, in expanded position.

FIG. 2c shows the rear view of the golf cart of present invention, in expanded position.

FIG. 3b shows the exploded view of the components in FIG. 3a.

FIG. 4a-4d show the movement sequence of folding down (collapsing) the golf cart of present invention.

FIG. 5a-5d show the movement sequence of expanding (unfolding) the golf cart of present invention.

DETAILED DESCRIPTION OF PREFERRED EMBODIMENT

Figure 3B:
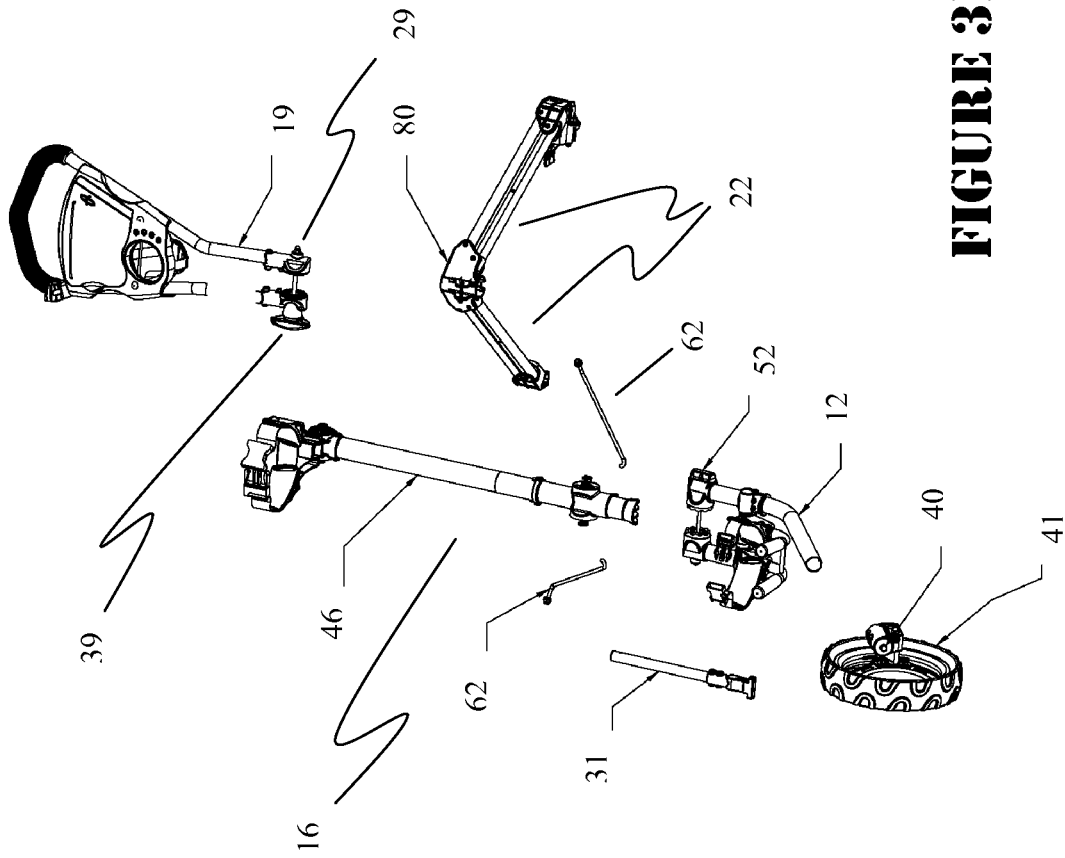
Figure 3A:
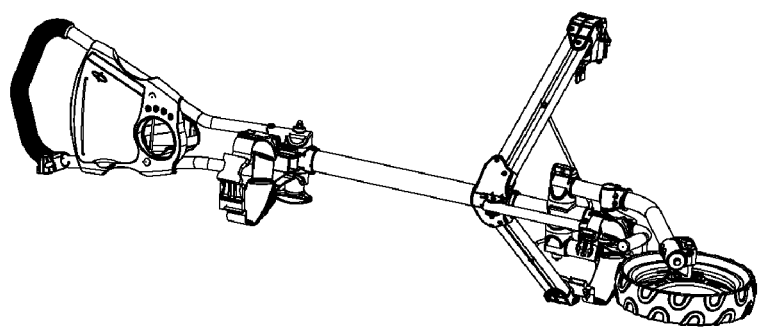
FIG. 3a shows the partial view of the golf cart, particularly on the collapsing portion.

FIGS. 3a and 3b shows the exploded view of some major components for the collapsible mechanism of present invention.

The collapsible golf cart 10 of present invention has a handle assembly 19, an upper frame assembly 16 and a lower frame assembly 12. The three major portions are easily seen by looking at the folding (collapsing) illustration in FIG. 4a-4d and unfolding (expanding) illustration in FIG. 5a-5d.

The upper assembly 16 primarily contains a straight tube structure 46 that allows objects to be slidably attached (such as a sliding joint 80, detailed later.)

The handle assembly 19 is pivotably connected to the upper assembly 16 by an upper joint 29. A locking knob 39 is provided along the joint axle of said upper joint 29, so that a user can turn the knob 39 to lock the handle assembly 19 in position, either the expanded position or the collapsed position.

The upper assembly 16 is pivotably connected to the lower assembly 12 by a lower joint 52. Said lower joint 52 has limited up-down travel on the lower portion of the tube structure 46 of said upper assembly 16. When the golf cart is in fully expanded position, the lower joint 52 will be traveling to the lowest point of the tube structure 46; when the golf cart is in fully collapsed position, the lower joint 52 will have an upward travel (limited travel of a couple of inches only) along the tube structure 46.

A locking tab 72 is provided along the joint axle of said lower joint 52, so that a user can tighten or release the locking tab 72 to lock the lower assembly 12 in position, either in the expanded position or in the collapsed position.

Figure 6C:
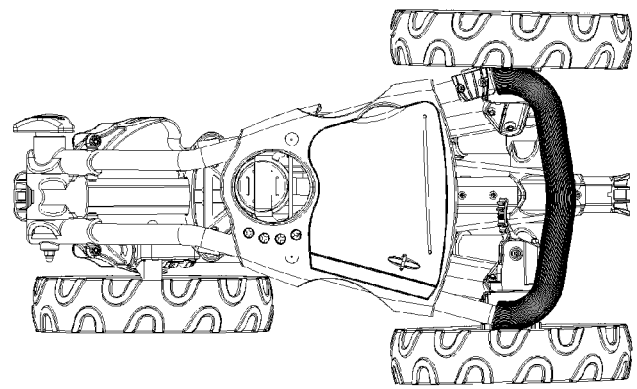
FIG. 6c shows the rear view of the golf cart of present invention, in collapsed position.
Figure 6B:
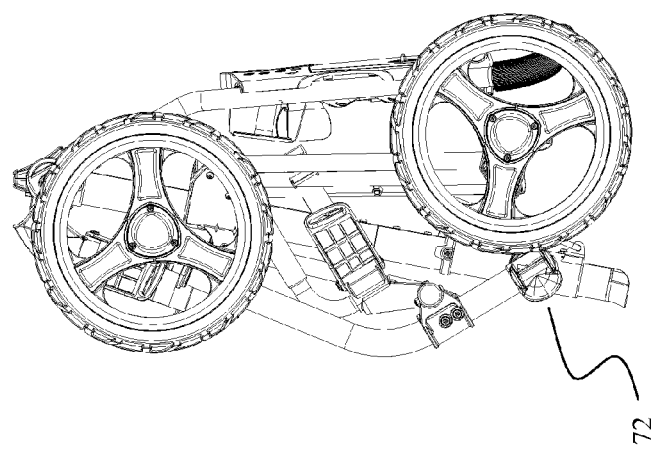
FIG. 6b shows the side view of the golf cart of present invention, in collapsed position.
Figure 6A:
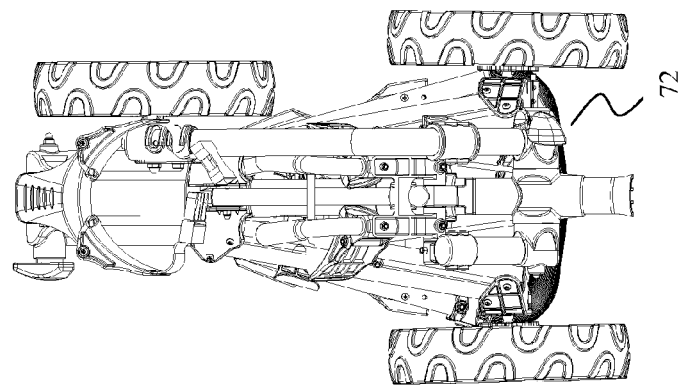
FIG. 6a shows the front view of the golf cart of present invention, in collapsed position.
Figure 6F:
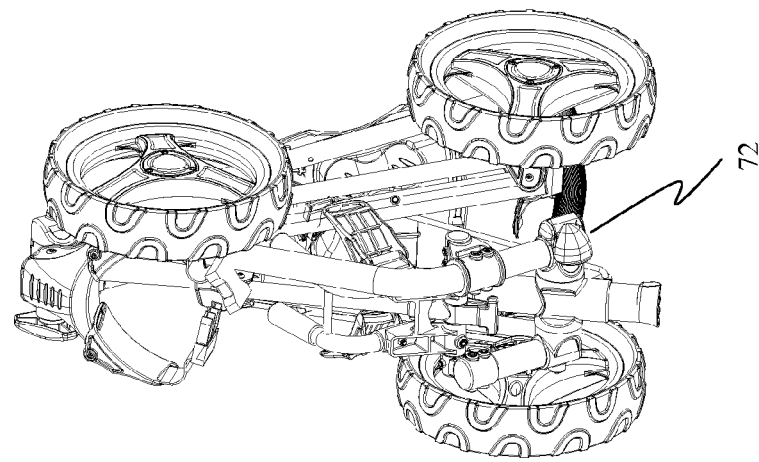
FIG. 6f shows the side perspective view of the golf cart of present invention, in collapsed position.
Figure 6E:
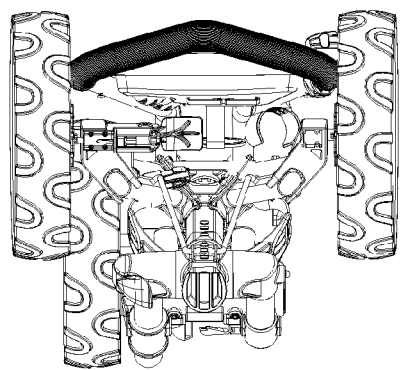
FIG. 6e shows the bottom-up view of the golf cart of present invention, in collapsed position.
Figure 6D:
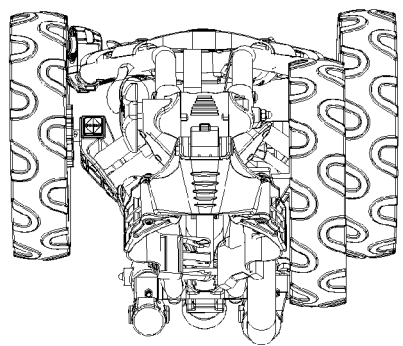
FIG. 6d shows the top-down view of the golf cart of present invention, in collapsed position.

FIGS. 6a, 6b and 6f show the locking tab 72 (in the collapsed position).

An upper bag holding ring 88 is located near said upper joint 29.

A lower bag holding ring 44 is located in the mid-section of said lower frame assembly 12, so that a golf bag can be placed into and be held (with tightening straps, not shown) in the space created by said upper bag holding ring 88 and lower bag holding ring 44, when the cart is in a fully expanded position.

The upper assembly 16 is made up primarily of a tube structure 46, allowing for a sliding joint 80 to move up and down the length direction of the tube structure 46.

In FIG. 4c, it can be seen that, to fold (collapse) the golf cart 10, the handle assembly 19 is folded towards lower-right (clock-wise) relative to the upper frame assembly 16, and lower frame assembly 12 (including the front wheel 41) is folded upwards (clock-wise). The lower joint 52 has limited upward travel along the lower portion of tub structure 46, only a couple of inches, when the golf cart 10 is being folded (collapsed).

FIG. 4c also shows, by an upward arrow, that a sliding joint 80 is being moved up the tube structure 46 of the upper assembly 16, where two side struts 22 are extended from said sliding joint 80 outward to receive the two rear wheels 23.

Each of the two side struts 22 are made of two parallel rods. This parallel rods structure is known art in golf cart industry and in many other fields and require no disclosure herein.

Figure 1:
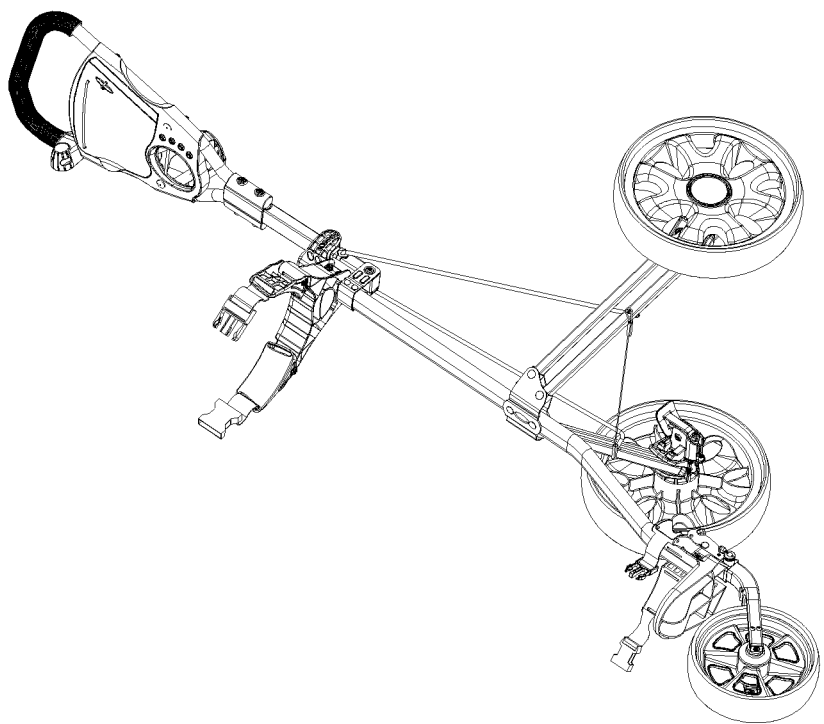
FIG. 1 shows the prior art structure of a simple 3-wheeled golf cart.
Figure 2F:
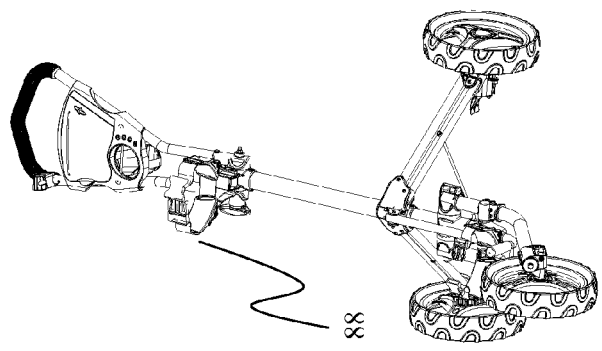
FIG. 2f shows a side perspective view of the golf cart of present invention, in expanded position.
Figure 2E:
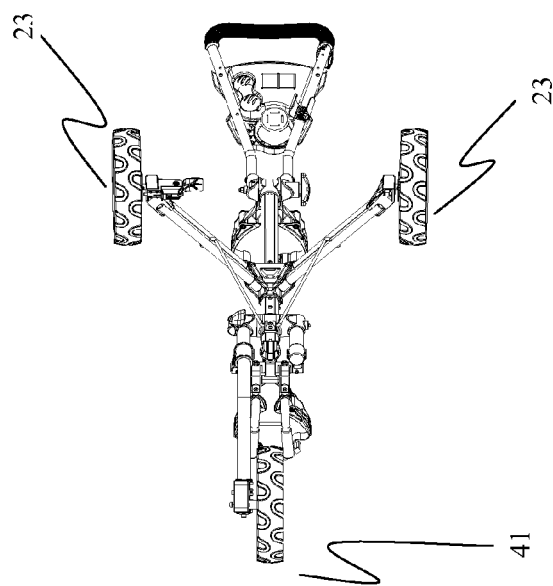
FIG. 2e shows the bottom-up view of the golf cart of present invention, in expanded position.
Figure 2D:
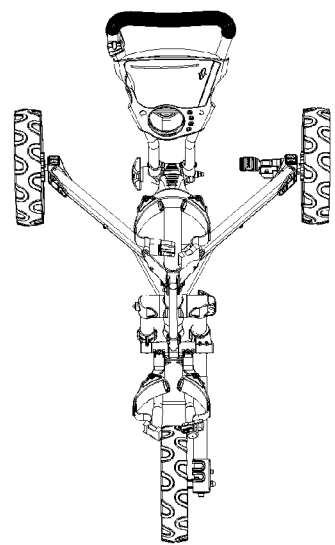
FIG. 2d shows the top-down view of the golf cart of present invention, in expanded position.

As shown in FIG. 2b, FIG. 3 and FIG. 4c, lower joint 52 connects the bottom part of upper assembly 16 and the top part of lower assembly 12, which supports a front wheel 41 at the other end of the lower assembly 12.

As part of the collapsing structure, one end of a primary strut 31 is pivotably connected to said sliding joint 80 and the other end of said primary strut 31 is pivotably connected to said lower frame assembly 12, so that when the lower frame assembly 12 is being folded up, as shown in FIG. 4c, the sliding joint 80 is pushed up along the length of the tube structure 46 of the upper frame assembly 16.

When unfolding the golf cart 10, the front wheel 41 is lowered, as shown in FIG. 5b, and the primary strut 31 pulls down the sliding joint 80. As the sliding joint 80 is sliding downward along tube structure 46, the two side struts 22 push down and open (widen distance between) the two rear wheels 42.

FIG. 3 also shows two link rods 62, each connected to one side strut 22 and the bottom portion of said upper frame assembly 16.

At fully expanded position, said primary strut 31 is lineally aligned with the length direction of tube structure 46 of said upper frame assembly 16, as shown in FIG. 2b. The two rear wheels 42 are pushed wide open by the two side struts 22, but are kept in fixed place by the two link rods 62.

At fully collapsed position, said two link rods 62 will stay close to a position almost lineally aligned with the length direction of said upper frame assembly 16, as shown by the figures in FIG. 4a-4d and FIG. 5a-5d, when sliding joint 80 is pushed up the tube structure 46 of the upper assembly 16, pulling in the two rear wheels 42, along with the two side struts 22.

A front wheel button-control unit 40 is attached to the front end of said lower frame assembly 12 to receive said front wheel 41, so that the front wheel 41 is able to be locked in two positions that are set 180-degree apart and axially around the axle of the lower frame assembly 12 tube structure. The first position of said front wheel 41 is the expanded position for regular use, as shown in FIGS. 2a and 2c, where the front wheel appear to be aligned with the center line 91 of upper frame assembly 16 and lower frame assembly 12.

The button-control unit 40 allows the front wheel to turn 180 degrees, to a second position, so that front wheel 41 is placed in an offset position away from the center line 91 of upper/lower frame assemblies 16/12, as shown in FIG. 4b or FIG. 5b, resulting in a tighter compact volume in the collapsed position, than if the front wheel 41 remains in the center line 91 position.

The front wheel 41 being folded and turned 180 degrees to a collapsed offset position is also clearly shown in FIG. 6a and FIG. 6c.

As can been seen, present application provides a collapsing design that is different from the teaching of Kimberley 644. Especially, Kimberly 644's collapsing mechanism turn all three wheels upward, causing the three wheels to be concentrated together (clearly seen in the figures in Kimberley 644, FIG. 6, particularly), whereas present application's collapsing mechanism spread out the weight of the wheels, and creating a compact volume with the weight distribution of the wheels in a non-concentrated fashion, as shown in the figures.

What is claimed is:

1. A collapsible golf cart comprising:
A handle assembly;
An upper frame assembly;
A pair of rear wheels pivotably attached to a pair of struts linked to said upper frame assembly;
A pair of link rods having one end pivotably connecting to a lower end of said upper frame assembly and another end pivotably connecting to said struts;
A lower frame assembly containing a front wheel, said lower frame pivotably connected to said upper frame assembly by a lower joint that has limited travel on the lower portion of said upper frame assembly; and,
A collapsing mechanism consisting of a sliding joint moveably attached to said upper frame with said pair of struts extending out to support said two rear wheels, said sliding joint having a primary strut connecting to said lower frame, so that when the golf cart is collapsing, the primary strut moves the sliding joint upward along the length of said upper frame assembly resulting in the lower frame assembly being folded up and the pair of rear wheels of said struts folded down, resulting in weight distribution of the wheels in a non-concentrated fashion.

2. The golf cart of claim 1, wherein said handle assembly is pivotably connected to said upper frame assembly by an upper joint.

3. The golf cart of claim 1, wherein said lower frame assembly further having button-control unit to mount said front wheel where said unit allows for 180 degree turns to be made along the axial orientation of said lower frame assembly, resulting in one position of front wheel aligning with the center line of said upper frame assembly and the other position being offset from the center line of said upper frame assembly and easy for collapsing into smaller volume.

4. The golf cart of claim 3, wherein a locking tab is provided along the joint axle of said lower joint, enabling a user to lock the lower frame assembly either in collapsed position for transport/storage or in expanded position for normal use.

* * * * *